United States Patent [19]
Mitchell

[11] Patent Number: 5,601,864
[45] Date of Patent: Feb. 11, 1997

[54] FISH-BASED FOOD PRODUCT RESEMBLING FRIED BACON PIECES

[76] Inventor: Duff W. Mitchell, P.O. Box 21938, Juneau, Ak. 99801

[21] Appl. No.: 406,593

[22] Filed: Mar. 20, 1995

[51] Int. Cl.⁶ .................................................. A23L 1/325
[52] U.S. Cl. .......................................................... 426/643
[58] Field of Search .................................... 426/643, 315, 426/465, 473, 518, 519, 92

[56] References Cited

U.S. PATENT DOCUMENTS

| | | | |
|---|---|---|---|
| 3,684,527 | 8/1972 | Walter . | |
| 3,812,267 | 5/1974 | Atkinson | 426/104 |
| 3,903,313 | 9/1975 | Maher et al. | 426/250 |
| 4,148,925 | 4/1979 | Pettinato et al. | 426/235 |
| 4,305,965 | 12/1981 | Cheney | 426/104 |
| 4,405,653 | 9/1983 | Gray | 426/473 X |
| 4,439,456 | 3/1984 | Kammuri et al. | 426/643 X |
| 4,537,788 | 8/1985 | Proctor et al. | 426/614 |
| 4,540,589 | 9/1985 | Rachi et al. | 426/643 X |
| 5,053,242 | 10/1991 | Goto et al. | 426/643 |
| 5,087,466 | 2/1992 | Coudrains et al. | 426/256 |
| 5,141,766 | 8/1992 | Miyakawa | 426/643 |
| 5,202,144 | 4/1993 | Yaiko | 426/574 |
| 5,225,231 | 6/1993 | Nakaie et al. | 426/641 |
| 5,350,586 | 9/1994 | Eckholm et al. | 426/643 X |

FOREIGN PATENT DOCUMENTS

| | | | |
|---|---|---|---|
| 58-47154 | 10/1983 | Japan | 426/643 |
| 60-153747 | 8/1985 | Japan | 426/643 |
| 61-1365 | 1/1986 | Japan | 426/315 |

Primary Examiner—Arthur L. Corbin

[57] ABSTRACT

A fish based food product resembles fried bacon which has been mixed and/or ground into a plurality of individual pieces. The imitation bacon pieces have a homogeneous consistency and are formed from the steps of mixing clean salmon with a flavor altering mixture in a mixing apparatus to produce a homogeneous paste, spreading the homogeneous paste into a thin sheet, heating the sheet until transformed into a pliable sheet, and grinding and mixing the pliable sheet into a plurality of individual pieces less than ¼ inch in diameter. The flavor altering mixture includes, inter alia, garlic, soy sauce, and white pepper. During the final mixing process, oil and a flavoring powder are added to the fish pieces to produce a product having the flavor, texture, and appearance of fried bacon pieces. The flavoring powder is preferably smoke powder and the oil is preferably canola oil.

23 Claims, 3 Drawing Sheets

FISH-BASED FOOD PRODUCT RESEMBLING FRIED BACON PIECES

BACKGROUND OF THE INVENTION

The present invention relates to a seafood based food product resembling pork and a method of making same. More particularly, the present invention relates to a salmon based food product resembling bacon which has been fried and ground into a plurality of individual pieces.

Pork toppings have traditionally enjoyed considerable favor among consumers both in the United States and abroad. Pork toppings (known by many to be sold as bacon bits) have been used as condiments on salads, chowders, soups, potatoes, steamed rice, egg dishes, bagels with cream cheese, celery sticks, along with a considerable variety of vegetables and hors d'oeuvres. However, pork products are generally high in cholesterol and animal fat, and also include an abundance of nitrites and nitrates. In fact, many consumers have sought to eliminate or severely limit the amount of pork that they consume in their diet. Moreover, many consumers do not eat pork products due to religious convictions. Thus a need exists for alternatives to pork products which have the look, feel, color, taste and texture of pork.

Fish based food products are generally believed to be low in cholesterol, low in fat and high in nutritional value. However, many of the fish products sold in North America are manufactured from fish caught in Alaska and the Pacific Northwest. Due to high costs associated with storage and transportation, it may not be economically viable to process certain types of fish. Alaskan pink salmon is this type of fish. Pink salmon is a neglected and wasted resource because it sometimes costs more to process, store and package than a retail price that consumers are willing to pay. Every year, tons of pink salmon are either legally or illegally dumped overboard by processors and fishers off Alaska's coastal waters. At the time of this patent application, pink salmon provides very little value to the fisherman. Most of the value is in the eggs, i.e. caviar or "roe" of the salmon. Salmon meat is therefore a by-product. Unfortunately, this significant source of protein, which has a relatively small wholesale cost, is not being effectively utilized in the market.

A number of prior patents have addressed the need for producing a value added seafood product. Eckholm et al., U.S. Pat. No. 5,350,586, disclose a boneless ham substitute made from whole fish fillets. According to Eckholm et al., a boneless ham substitute may be made from whole fish fillets which have been mixed in a tumbler with nitrite and salt. The nitrite and salt assist in the extraction of salt soluble proteins. Sodium phosphates and sodium erythorbate are then added to respectively reduce moisture and oxidation. The mixture is then extruded through a vacuum stuffer into a netting and bound with an edible collagen film. After cooking, the product then appears as a boneless ham.

Other processed seafood patents have addressed consumer demand for flake style and chip-type food products. Nakaie et al., U.S. Pat. No. 5,225,231, disclose a process for producing a flake style food made from dehydrated vegetables, a seasoning solution and a protein source such as fish, poultry or cattle meat. The product is obtained by mixing the vegetables and seasoning through stirring in a temperature zone of 10° to 80° Celsius for 1 to 10 minutes. The emulsion is then mixed with fish, poultry or cattle meat. Walter, U.S. Pat. No. 3,684,527, discloses a process for preparing a chip-type product made from clams but which resembles potato chips. Chopped clam particles are added to monosodium glutamate, lemon juice and soy sauce then mixed for several minutes. The mixture is then heated between 130° to 212° Fahrenheit, spread onto thin sheets, such as cookie sheets, and subjected to drying. The resulting sheets are then baked to form a skin, and are available for further processing such as deep frying.

While a variety of unique seafood products have been shown, there exists a need for an economically viable seafood-based product which resembles pieces of fried bacon and which may be used by consumers as a condiment, topping, or seasoning.

SUMMARY OF THE INVENTION

It is therefore an object of the present invention to provide a product which will have the flavor, consistency, aroma, color and texture of pork and a method of making same.

It is a further object to provide a fish based product resembling fried pork pieces which includes a distinctive shine, and a glistening appearance and does not include an offensive or "fishy" aftertaste.

It is still another object to provide a value added, salmon based food product which may utilize a low value salmon such as Alaskan pink salmon to produce a palatable condiment, food topping, and/or seasoning.

It is still another object to provide a pork alternative product which does not contain animal fats or nitrates.

Another object is to provide a shelf stable seafood product which does not contain artificial preservatives, artificial colors or nitrates.

It is a further object to provide a smoke flavored, fish based product which is resistant to the flavor leaching effects of glass, plastic and metal containers, and is flavor stable on the shelf for an extended period of time.

Another object is to provide a combination of machinery, additives, and process controls which will transform the appearance of salmon into food pieces resembling fried pork.

It is still a further object to take advantage of underutilized salmon species that currently have little value relative to higher grade species. Objects of the invention are achieved by providing a process that creates a high value product using relatively low valued raw material. The process reduces the net weight of the ground boneless/skinless salmon by two thirds. This associated reduction in weight makes this process economically viable in remote and distant locations from markets having associated high transportation costs.

This process may also utilize soft or damaged fish which would be otherwise unacceptable in more conventional salmon products. A salt or sodium based formula in combination with moisture removal provides shelf stability. This process may be readily used with or without the use of artificial preservatives.

These and other objects will become readily apparent to those skilled in the art through a review of the following description taken in conjunction with the accompanying drawings.

BRIEF DESCRIPTION OF THE DRAWINGS

FIG. 4 is perspective view of a vacuum massage tumbler.

FIG. 6 is a perspective view of a vertical cutter-mixer.

DETAILED DESCRIPTION OF THE PREFERRED EMBODIMENTS

Figure 1:
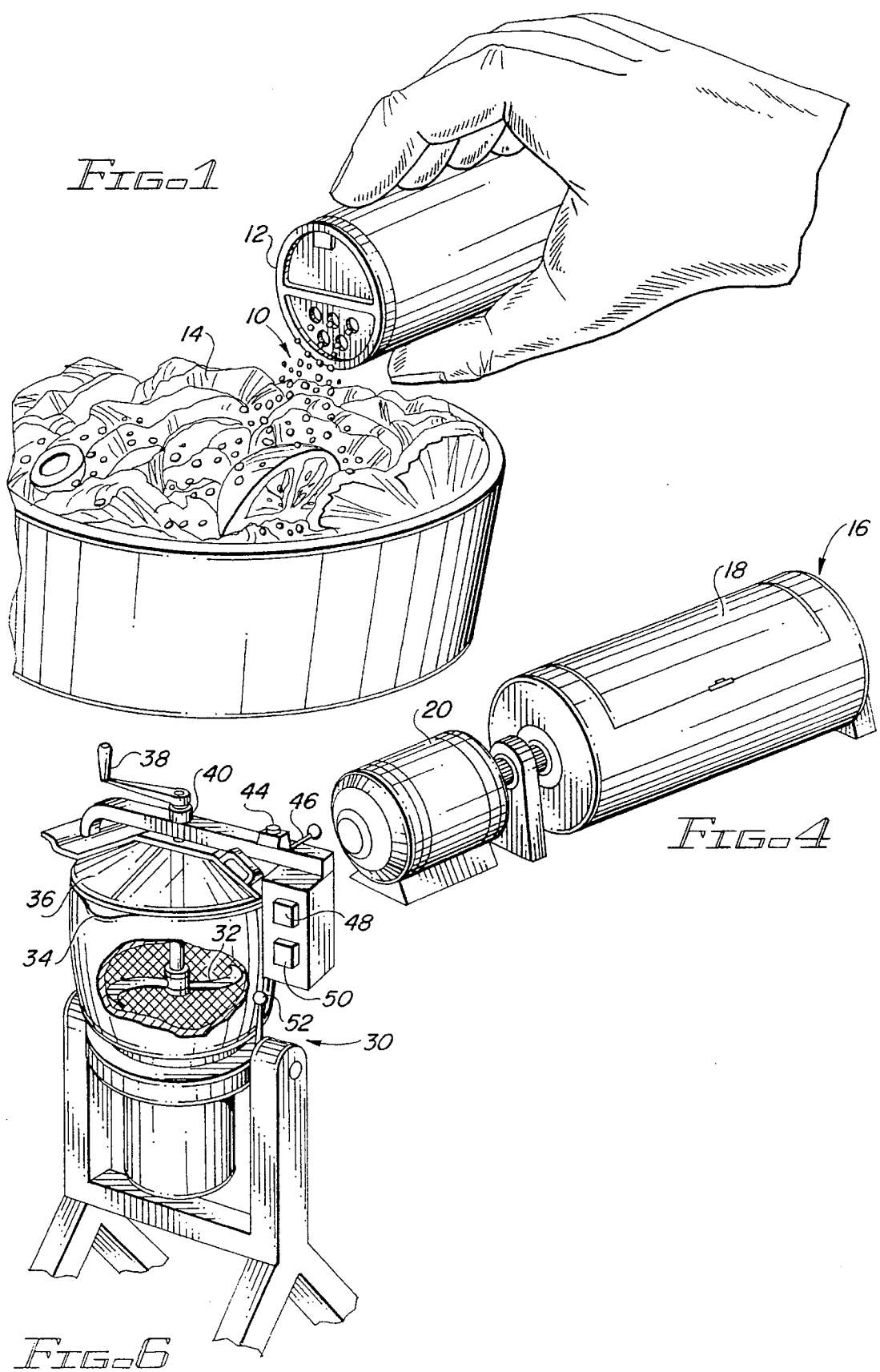
FIG. 1 is a perspective view of a product according to an embodiment of the present invention used as a condiment for a salad.

With reference now to the figures and more particularly FIG. 1, a perspective view of a product according to the present invention is illustrated. FIG. 1 illustrates food product 10 being sprinkled from container 12 onto salad 14. While the present product is made from fish, it resembles and may be used in place of commercially available fried bacon pieces. As a condiment, the product may be used as a salad or potato topping or may be used as a seasoning in soups, gourmet dishes and the like.

Figure 2:
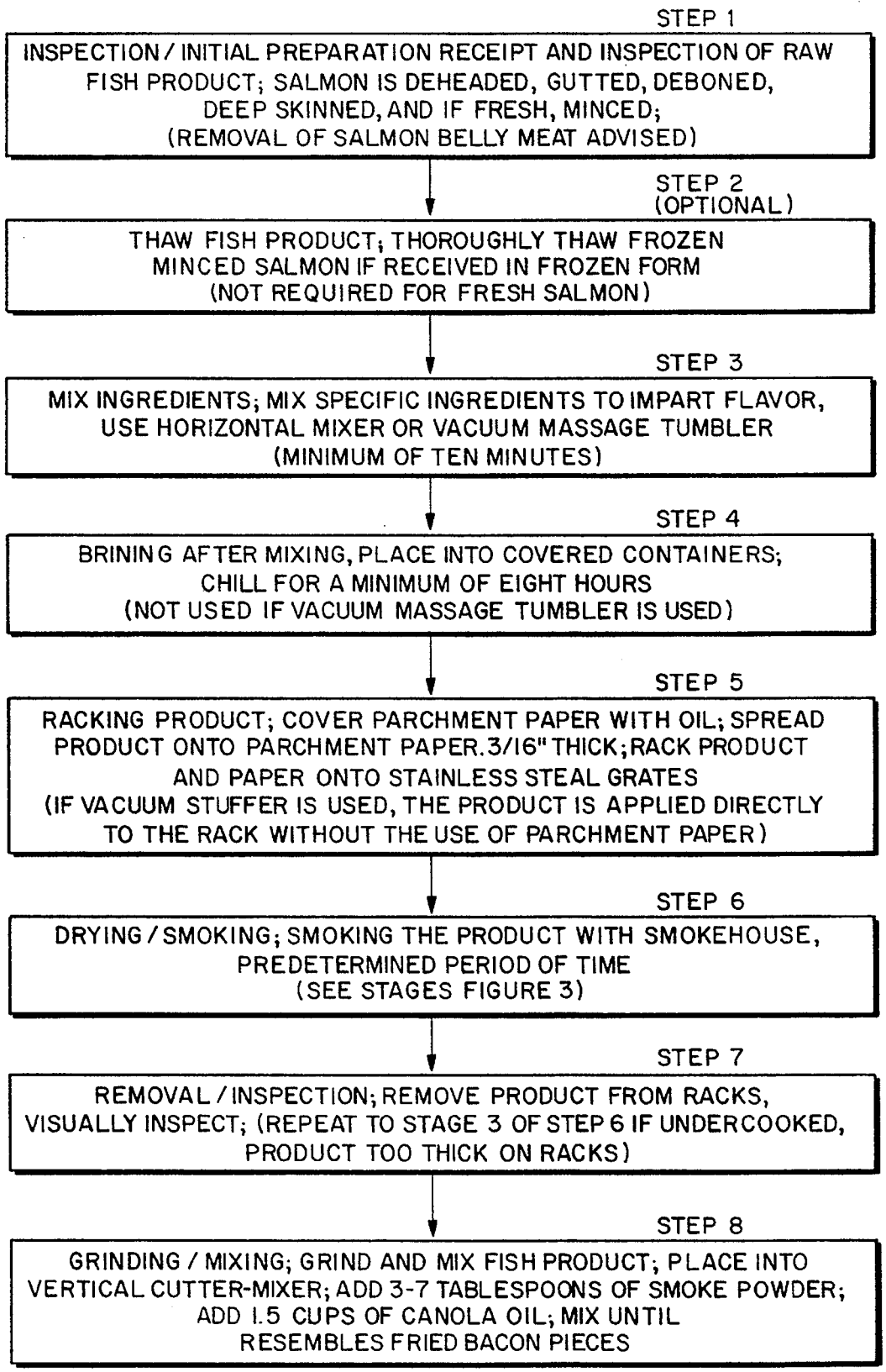
FIG. 2 is a flow chart illustrating the general steps used for manufacturing the product.

FIG. 2 illustrates a flow chart outlining a commercially viable process for manufacturing a fish based food product resembling pieces of fried bacon. Step 1 recites the receipt and inspection of the raw fish product. While a number of seafood products may be used to practice the present invention, fish meat is preferred. More particularly, due to economic considerations, salmon is more desirable, while the pink and chum species are the most desirable. Other species produce an acceptable product however differing species should not be mixed. Different species of salmon have differing oil contents and therefore require different brine formulas, cooking times, and smoking times. Mixing different species of salmon may be practiced in accordance with the present invention, however an increased burden of quality control is introduced.

Further to step 1, the salmon must be headed, gutted, deboned, and deep skinned to ensure that the skin and the fat, that lies directly underneath the skin, is removed. Pieces of blood, flesh, scales or fat will negatively impair the resulting flavor and will also accelerate rancidity due to the presence of oils. Although not necessary for the practice of the present invention, the removal of the salmon belly meat is advised due to a higher concentration of oils therein. The salmon may be processed fresh or may be stored as frozen blocks of minced meat. Storing the salmon as frozen blocks at very low temperatures destroys harmful organisms, thereby complying with Food and Drug Administration guidelines. This also allows the fish to be stored and processed at a later date long after the fish are caught.

Step 2 (optional) recites the thawing of the frozen minced blocks of salmon. Step 2, of course, will not be required when fresh salmon is used. The frozen blocks are generally wrapped in beck block paper or plastic which must be removed prior to thawing. The frozen blocks are placed onto shelves or placed in a cooler to thaw. The fish should be thoroughly thawed, as a partially thawed product does not brine very well. Furthermore, partially thawed pieces present before processing impart a chunky appearance into the end product which leads to poor quality.

Step 3 recites the mixing of specific ingredients to impart a desirable flavor to the fish product. As a representative sample, a smoked salmon version of salmon bits is shown. However, it should be easily understood to those skilled in the art that other formulations could impart other flavors such as Cajun, Thai, Mexican, teriyaki flavor, pepper flavor or salsa. The below ingredients, as shown in Table 1, are mixed in a commercial meat mixer or vacuum massage tumbler to impart a smoked salmon flavor to the product.

TABLE 1

Smoked Salmon Formulation

| Ingredient | Amount of Ingredient |
| --- | --- |
| Liquid Soy Sauce | 18 cups |
| Dehydrated Soy Sauce | 8 cups |
| Brown Sugar | 9 cups |
| granulated dehydrated garlic | 21 table spoons |
| garlic salt | 21 teaspoons |
| natural smoke oil | 8 table spoons |
| citric acid | 10.5 teaspoons |
| white pepper | 9 teaspoons |

The above ingredients are mixed until they become a thick slurry. Ninety-nine pounds of thawed, drained and minced salmon are then added and mixed. Ninety-nine pounds are used in this example because blocks of salmon are generally stored in 16.5 pound blocks. Six blocks of minced salmon may thus be conveniently used to produce a single batch of product.

The slurry is mixed for a minimum of 10 minutes so that it becomes a homogeneous, thoroughly mixed mass of product. After mixing, the product resembles a thick, sticky dough and may be referred to as a flavored fish paste or brine mixture.

Apart from their use as a flavor enhancing agent, many of the sample ingredients as listed above in Table 1 have been specifically chosen based upon the function that they provide. Over fifty different formulations have been attempted to arrive at a combination of ingredients which produces a palatable final product.

The soy sauce, as listed in Table 1 above, imparts numerous attributes into the final product apart from its function as a flavor inducing agent. Soy sauce is also a saline imparting agent due to its high salt content. Salt assists in the extraction of salt soluble proteins from the minced fish pieces during mixing. This use as a protein extracting agent enables and facilitates subsequent binding of the fish pieces with other ingredients. The soy sauce also functions as a moisture imparting agent to add to the slurry content of the mixture. Should a substitute for soy sauce be used by those skilled in the art, it would be apparent that water may be added to the mixture to function as a moisture imparting agent. In that case, of course, a saline imparting agent or other extracting agent would also be used.

Liquid soy sauce also acts as a coloring agent to give the final product an appearance which closely resembles natural fried bacon pieces. Use of soy sauce allows the product to be produced without the addition of artificial coloring agents. Once again, soy sauce could be removed from the mixture and substituted with another material acting as a coloring agent. Substitutes which are contemplated by the present invention include carmel coloring and molasses. However, if molasses is used, a suitable reduction in brown sugar should also be provided so that the product will not taste overly sweet.

The dehydrated soy sauce assists the liquid soy sauce as a protein extracting agent, a saline imparting agent, and a coloring agent. The dehydrated soy sauce, as well as the liquid soy sauce, imparts a noticeable flavor along with the other ingredients listed above which thereby enhances the simulation of a fried bacon product.

The brown sugar acts as a coloring agent for simulating a fried bacon product and also acts as a sweetener or sweetening agent. The presence of sugar may also assist in binding the other materials together within the slurry.

Granulated dehydrated garlic acts as a flavor masking agent for noticeably eliminating the presence of a "fishy" aftertaste. Through experimentation it has been found that the formulation given above, in conjunction with the garlic salt outlined below, virtually eliminates the presence of a fish aftertaste while not providing a palatably noticeable garlic taste. Substitutes for granulated dehydrated garlic are: fresh garlic, garlic oil, onion oil and pepper oil. The presence of fresh garlic will impart moisture which will need to be accounted for with another ingredient or dehydrating agent. Likewise, garlic oil will also increase the moisture content, such that a corresponding reduction in moisture from other ingredients or a suitable dehydrating agent should be introduced.

Garlic salt is also added to increase the flavor masking properties of the granulated dehydrated garlic. The total amount of actual garlic is the combination of dehydrated garlic and garlic salt. Accordingly, an increase in the amount of one ingredient would dictate a corresponding decrease in the amount of the other. Garlic salt also adds the benefits of salt. Garlic salt, as outlined above with reference to soy sauce, acts as a saline imparting agent thereby acting as a binding agent and a protein extracting agent.

The salt found in the soy sauce, dehydrated soy sauce and garlic salt is also needed to increase the effective shelf life of the product. Salt is a natural preservative or shelf stabilizing agent which meets the guidelines of the U.S. Food and Drug Administration. Without the use of salt, another suitable shelf stabilizing agent must be used. Although not within the preferred embodiment of the present invention, numerous phosphates (such as sodium tripoly phosphate, sodium poly phosphate glassy, sodium pyrophosphate, and sodium acid pyro phosphate) and nitrates or nitrites may be used. As stated above, salt (NaCl) is a natural binding agent which assists in coagulating the slurry mixture.

The smoke oil is a moisture imparting agent and a flavor imparting agent. The smoke oil assists in masking the "fishy aftertaste" as a flavor masking agent. However the function of smoke oil in the overall process apart from that of flavor imparting agent is not significant. Likewise the citric acid and white pepper function primarily as flavor imparting agents while insignificantly assisting as a flavor masking agent for masking the "fishy aftertaste."

The above ingredients, along with the salmon, may be mixed in a horizontal meat mixer or a vacuum massage tumbler.

FIG. 4 illustrates vacuum massage tumbler 16 for the present invention. The ingredients are first placed into opening 18. Tumbler 16 is then rotated by motor 20 while a vacuum pressure is applied. Fish meat is particularly sensitive to mechanical action and readily breaks down, as compared with beef or poultry, under the application of force. Accordingly, the fish meat should not be mixed more than 10 minutes in the horizontal meat mixer to avoid undue breakdown of the product. A vacuum massage tumbler may be used to thoroughly mix the product under pressure. In this case, since the product is so thoroughly mixed by the vacuum massage tumbler, the brining step (step 4) is not needed. The use of a vacuum massage tumbler is preferred since a greater amount of product may be produced and a decreased total manufacture time (by eliminating step 4) may be achieved.

Step 4 recites a product settling or brining process. After mixing, the product is placed into covered containers and placed into a cooler for a minimum of eight hours. This brining process allows the materials to bond or brine together and adds to the homogeneity of the mixture. The brining process is assisted by the protein extracting agents and binding agents as listed above.

Step 5 recites the racking of the product. After brining, the product is placed onto racks that fit within a smokehouse cart. A few different ways exist in which the product may be placed on the rack while keeping within the spirit and scope of the present invention. In a preferable method, an extruding machine extrudes a thin sheet of product no greater than ½ inch in thickness onto the rack. A thickness of less than ¼ of an inch is more desirable and a thickness approximating 3/16 of an inch is most desirable. The product should, however, be greater than 1/16 inches thick to avoid overdrying and brittleness. Furthermore, if the sheet is too thin, the production output becomes uneconomical for the amount of labor involved. The rack is preferably a flat grate of stainless steel and/or plastic TEFLON with dimensions of approximately 36"×39". These dimensions are not significant since a product thickness of 3/16 of an inch promotes uniform heating and drying. The sheet of product is preferably deposited onto the rack via parchment paper which has been sprayed with an oil such as vegetable oil. Parchment paper is significant so that the product, which is in the form of a paste or brine, does not droop between the grates of the rack. Alternatively, the product may be placed onto another type of non-stick netting material.

To rack the product, the product in paste form may be spread onto sheets with a spatula. As an alternative, a piston stuffer may be used to extrude the product onto sheets (step 5). A piston stuffer is the preferred method of placing the product onto the sheets since greater speed and quality control may be achieved.

Undesirable consequences may result from the application of a layer of product which is either too thick or too thin. If the product is too thick, the outside edges will become hard faster than the interior sections. The product must be cooked in its entirety, to impart the appropriate hardness to the interior sections and to avoid an unpleasant aftertaste. A thoroughly dried material, i.e. one that is thin enough for even cooking, adds to the shelf stability of the product.

Figure 3:
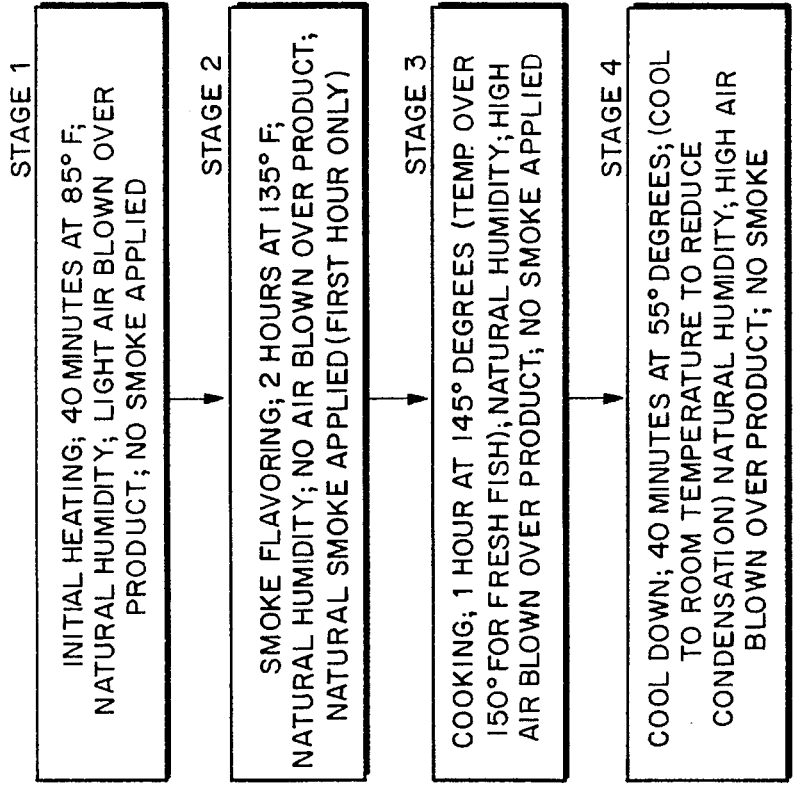
FIG. 3 is a flow chart showing the different stages for smoking the product.

Step 6 involves loading the racks of product into a smokehouse for a predetermined period of time. The product is actually processed within the smokehouse in four stages. These four stages are set forth in reference to FIG. 3. The four different stages require different settings for the smokehouse. In stage 1, the product is cooked for 40 minutes at a temperature of 85° Fahrenheit and natural humidity. A small amount of air is blown over the product by setting the blower to a low setting. This is to induce drying and to remove surface moisture from the product. At this stage no smoke is applied to the product. While the presence of humidity, as a by product from the mixture, may play a role in action between the ingredients, it does not appear through experimentation that precise control over humidity is of particular significance.

Figure 5:
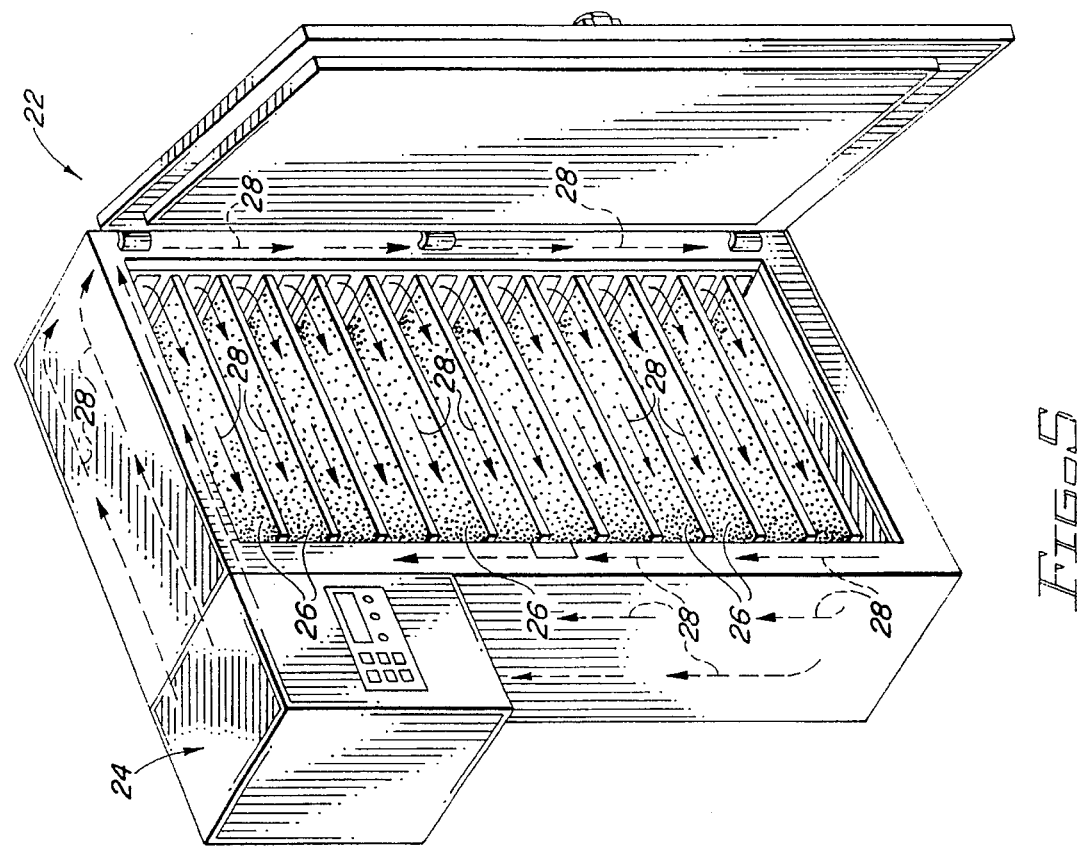
FIG. 5 is a perspective view of a horizontal airflow smokehouse.

FIG. 5 illustrates horizontal smoke house 22. Racks of product 26 are placed within smoke house 22 while airflow 28 is circulated horizontally thereabout.

Stage 2 lasts for 2 hours while the product is continually cooked at a temperature of 135° Fahrenheit. The damper is closed and natural smoke is applied. Smoke need only be applied during the first hour of operation under stage 2 to impart the desired smoke flavoring. On the other hand, if a non-smoke flavor is desired, smoke is not added.

During stage 3, the temperature is increased to 145° Fahrenheit with the damper open. Stage 3 lasts for approximately 1 hour. If fresh fish is used, the temperature is increased to 150° Fahrenheit in order to kill any microorganisms which may be present. It should be noted that the temperature does not need to exceed 150° Fahrenheit if the fish was frozen to sub zero temperatures to be in accordance with guidelines set forth by the Food and Drug Administration and the State of Alaska.

Stage 4 lasts for 40 minutes wherein the temperature is decreased to 55° Fahrenheit. This stage cools down the product to room temperature without sweating or building up condensation. Improved quality thus results. For economic reasons, it is desired that the product is smoked and dried in the most expeditious manner possible which does not degrade the quality thereof. Further, it is desirable that the product is shelf stable upon removal from the smokehouse such that further processing, i.e. grinding and mixing in step 7, may be delayed.

Actual smoking times and durations at specific temperatures will vary depending on the type and brand of the smokehouse. A horizontal air flow smokehouse, for example, produces the product in a more uniform and consistent manner. As an additional consideration, the greater the airflow in the smokehouse, the less time needed to fully cook the product. However, too much airflow in the smokehouse, or an excessive temperature at the beginning stages will cause undue hardening of the product. A horizontal airflow smokehouse is most desirable for producing the present invention. A horizontal airflow smokehouse circulates the air horizontally over the sheets of product such that uniform smoking and dryness may be achieved. However, other types of smokehouses, such as vertical airflow smokehouses may not be effectively used. A vertical airflow smokehouse relies upon the air penetrating around portions of the product, such as fish fillets for smoking the entire contents. Since the product during this step is formed from uniform sheets, the smoke may not penetrate through or around the product for adequate smoking and drying.

The following Table 2 illustrates preferred settings and times for a horizontal smokehouse.

TABLE 2

| | | Smokehouse Stages | | | | |
| --- | --- | --- | --- | --- | --- | --- |
| Stage | Time | Temp. | Humid. | Damper | Blower | Smoke |
| 1 | 40 min. | 85 | natural | open | low | no |
| 2 | 2 hr. | 135 | natural | closed | low | 1st hr. |
| 3 | 45–60 min. | 135 | natural | open | high | no |
| 4 | 40 min. | 55 | natural | half | high | no |

Step 7 recites the removal of the product from the racks. A firm, yet pliable leathery product is removed from the parchment paper or other material in the racks. The product should now resemble a dry yet pliable fruit leather. The dried product is then placed into a clean bin to await further processing. At this step, a visual inspection is made. If the product is not easily removed from the racks, it is not thoroughly dried and smoked. The product must then be reapplied through stage 3 of the smokehouse stages. It is possible that the product was accidently applied thicker than 3/16 of an inch. Once again, the product should be shelf stable at this point such that step 8 may be delayed without risk of contamination of the product.

Step 8 recites the grinding and mixing of the leathery fish product. The product is first placed into a cutter-mixer. While a variety of cutter-blenders may be used, it has been found through extensive experimentation that a vertical cutter mixer as shown in FIG. 6 is most desirable. Ten pounds (10 lbs.) of dry product is first cut into one inch to two inch pieces. There is no particular advantage in cutting the sheets in this manner apart from placement into the vertical cutter mixer. The product is then placed into the vertical cutter mixer of FIG. 6.

FIG. 6 illustrates vertical cutter mixer 30 for cutting and mixing the product. Mixer 30 includes baffle mixing bowl 34 which is covered by see-through cover 36. Cut/mix attachment 32 is disposed within bowl 34 for grinding and mixing the product. After the product is placed within bowl 34, cover latch 46 is latched and baffle handle 38 is rotated through lock knob 40 to turn attachment 32. Start switch 48 initiates operation of mixer 30 while stop button 44 and jog/run switch 50 may be used to stop operation. Upon completion of mixing, bowl 34 may be tilted by way of tilt lever 52 to remove the product therefrom.

Next, 3–7 tablespoons of smoke powder are added to the mixture. The amount of smoke powder added depends upon perceived moisture content and the type of powder used. The drier the product, which may be a result of a variety of factors including the oil content of the initial salmon or the relative humidity of the smokehouse, the less powder is added. As outlined above, smoke powder could be hickory, mesquite, or alder smoke. Each type of smoke powder has an associated quality and strength. Accordingly, different amounts than those listed above may need to be used. Rather than smoke powder, a number of other flavorings or seasonings may be added to impart a different taste for different potential markets.

1.5 cups of oil are also added to the product along with the flavoring powder. The preferred oil is canola oil. It should be noted that a number of oils may be used such as: peanut oil, sesame oil, vegetable oil, olive oil, coconut oil or other commercially available food oils. However, it has been found that canola produces the best results because it is low in saturated & unsaturated fat and therefore contributes toward making the product more healthy. The product is then mixed and cut into pieces of ¼ inch or less. A visual inspection is then made to determine appropriate moisture content and product appearance. Additional oil and/or powder may then be added.

Next, the vertical cutter mixer is operated again to cut and shred the product into its final form. The vertical cutter mixer imparts heat to the product during this final stage. The addition of mild heat in this form appears to assist the smoke powder in bonding to the oil and the product. A visual inspection of the product also shows that the oil partially saturates the product at this point. The frictional generation of heat by the vertical cutter mixer may assist in the absorption of the oil and powder by the product. It also appears that some of the smoke powder is mixed with the oil before absorption into the product thus providing a consistent taste throughout. It should be noted that other flavoring powders and oils can be substituted to impart differing flavors.

While all steps in the above process work together to provide the ultimate product, this final step or step 8 appears to be most important. It is the combination of the oil and smoke powder which are added to the product at this stage which gives the product the appearance and texture of fried bacon pieces. Without this step, the product would appear to resemble a shredded jerky and powder product.

The presence of oil, preferably canola oil, and smoke powder impart a number of characteristics to the present invention, namely: a glisting shine, moisture, and increased penetrability of the materials into the salmon. The oil acts as a penetrating agent for improving the texture and palatability, i.e. chewable texture, and mouth feel. The oil also acts as a catalyst for improved introduction of the powder into the salmon product.

It will be apparent to those skilled in the art that various adaptations or changes to specific ingredients may be made without departing from the spirit and scope of the present invention. For example, pepper oil, salt and cajun spice may be substituted for the soy sauce in step 3. Further, the product may be heat dried in a smokehouse without the addition of natural or atomized smoke. However, other atomized flavoring oils may be substituted. During the mixing and grinding step, more cajun powdered spices could be added to replace the smoke powder.

I claim:

1. A food topping having the flavor, texture, and appearance of bacon which has been cooked and separated into a plurality of individual pieces, comprising a mixture of:

fish meat which has been headed, gutted and deboned;

a flavor altering mixture comprising a fish flavor masking agent, salt and water; and an edible oil;

wherein the fish meat and the flavor altering mixture are mixed into a paste, spread into a thin sheet, cooked for a predetermined period of time to produce a pliable sheet, cut into a plurality of individual pieces less than ¼ inch in diameter, and mixed with the edible oil, and wherein the food topping does not contain nitrates.

2. The food topping according to claim 1 wherein said plurality of individual pieces are covered with a flavor inducing powder.

3. The food topping according to claim 1 wherein said plurality of individual pieces are visually inspected and then mixed with additional edible oil.

4. The food topping according to claim 1 wherein the fish is salmon.

5. The food topping according to claim 4, wherein the salmon is Alaskan Pink Salmon.

6. The food topping according to claim 4, wherein the salmon is Alaskan Chum.

7. The food topping according to claim 1 wherein said flavor altering mixture further comprises soy sauce and garlic.

8. The food topping according to claim 1 wherein said flavor altering mixture further comprises citric acid and white pepper.

9. The food topping according to claim 1 wherein said flavor altering mixture consists essentially of:

i. a fish flavor masking agent including garlic;

ii. soy sauce;

iii. white pepper;

iv. salt and water.

10. The food topping according to claim 1 wherein the plurality of cut individual pieces are visually inspected then further cut and shred while imparting heat to the pieces.

11. The food topping according to claim 1, wherein the thin sheet of paste is heated and dehydrated in a smokehouse to thereby change into the pliable sheet.

12. The food topping according to claim 1, wherein the fish meat has been deep skinned to remove fish skin and fish fat.

13. The food topping according to claim 1, further comprising:

soy sauce;

brown sugar;

garlic;

citric acid; and pepper.

14. The food topping according to claim 13, wherein the soy sauce comprises liquid soy sauce and dehydrated soy sauce and wherein the pepper is white pepper.

15. The food topping according to claim 13, wherein the garlic comprises garlic salt and granulated dehydrated garlic.

16. The food topping according to claim 13, further comprising:

natural smoke oil.

17. The food topping according to claim 1, wherein the salt is a first saline imparting agent, and further comprising:

a second saline imparting agent; and a moisture imparting agent.

18. The food topping according to claim 1, further comprising:

a first coloring agent; and a second coloring agent, wherein the first and second coloring agents cooperate to produce a color resembling the appearance of bacon which has been cooked.

19. The food topping according to claim 1, wherein the salt is a first protein extracting agent, and further comprising:

a second protein extracting agent, wherein the first and second protein extracting agents cooperate to bind the fish pieces with other ingredients and thereby promote shelf stability.

20. A food topping having the flavor, texture, and appearance of bacon which has been cooked and separated into a plurality of individual pieces, comprising a mixture of:

fish meat which has been headed, gutted and deboned;

a flavor inducing powder; and an edible oil;

wherein the fish meat is mixed into a paste, spread into a thin sheet, cooked for a predetermined period of time to produce a pliable sheet, cut into a plurality of individual pieces less than ¼ inch in diameter, and mixed with the flavor inducing powder and the edible oil, and wherein the food topping does not contain nitrates.

21. A food topping having the flavor, texture, and appearance of bacon which has been cooked and separated into a plurality of individual pieces, comprising a mixture of:

fish meat which has been headed, gutted and deboned;

a flavor altering mixture comprising a fish flavor masking agent, salt and water; and an edible oil;

wherein the fish-meat and the flavor altering mixture are mixed into a paste, spread into a thin sheet, cooked for a predetermined period of time to produce a pliable sheet, cut into a plurality of individual pieces less than ¼ inch in diameter, and mixed with the edible oil; and wherein said food topping does not contain animal fats or nitrates.

22. A food topping having the flavor, texture, and appearance of bacon which has been cooked and separated into a plurality of individual pieces, comprising a mixture of:

fish meat which has been headed, gutted, deboned, and cut into pieces less than ¼ inch in diameter;

a flavor altering mixture comprising a fish flavor masking agent, salt and water; and an edible oil;

wherein said food topping does not contain animal fats or nitrates.

23. A food topping having the flavor, texture, and appearance of bacon which has been cooked and separated into a plurality of individual pieces, consisting essentially of a mixture of:

fish meat which has been cut into pieces less than ¼ inch in diameter;

a fish flavor masking agent;

salt;

water; and an edible oil.

* * * * *